(12) United States Patent
Tatarnikov et al.

(10) Patent No.: US 9,702,978 B2
(45) Date of Patent: Jul. 11, 2017

(54) METHODS FOR MODELING MULTIPATH REFLECTIONS OF GNSS SIGNALS USING A TEST INSTALLATION AND APPARATUSES FOR IMPLEMENTING TEST METHODS

(71) Applicant: Topcon Positioning Systems, Inc., Livermore, CA (US)

(72) Inventors: Dmitry V. Tatarnikov, Moscow (RU); Ivan M. Chernetskiy, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 453 days.

(21) Appl. No.: 14/395,477

(22) PCT Filed: Jan. 16, 2014

(86) PCT No.: PCT/RU2014/000022
§ 371 (c)(1),
(2) Date: Oct. 18, 2014

(87) PCT Pub. No.: WO2015/108437
PCT Pub. Date: Jul. 23, 2015

(65) Prior Publication Data
US 2016/0209512 A1    Jul. 21, 2016

(51) Int. Cl.
*G01S 19/22* (2010.01)
*G01S 19/23* (2010.01)
*H01Q 15/16* (2006.01)
*G01S 19/01* (2010.01)
*G01S 19/03* (2010.01)
*G01S 19/36* (2010.01)

(52) U.S. Cl.
CPC .............. *G01S 19/23* (2013.01); *G01S 19/01* (2013.01); *G01S 19/03* (2013.01); *G01S 19/22* (2013.01); *G01S 19/36* (2013.01); *H01Q 15/168* (2013.01)

(58) Field of Classification Search
CPC .......... G01S 19/23; G01S 19/01; G01S 19/22; G01S 19/36; H01C 15/168
USPC ..................................................... 342/357.61
See application file for complete search history.

(56) References Cited

FOREIGN PATENT DOCUMENTS

| RU | 2446522 | 3/2012 |
|---|---|---|
| WO | 0269447 | 6/2002 |
| WO | 2004027920 | 1/2004 |

OTHER PUBLICATIONS

Klionovski, Jun. 2013, IEEE, vol. 61, No. 6, 1-9.*
Search Report in PCT/RU2014/000022, dated Oct. 16, 2014.

* cited by examiner

*Primary Examiner* — Harry Liu
(74) *Attorney, Agent, or Firm* — Bardmesser Law Group

(57) ABSTRACT

A test installation for simulating multiple reflections of GNSS signals, the installation including a top screen that is semitransparent in a radio frequency portion of the electromagnetic spectrum, wherein the top screen is substantially dome-shaped; a bottom screen that is reflective in the radio frequency portion of the electromagnetic spectrum; the top semitransparent screen over the bottom reflecting screen; and a GNSS antenna connected to a receiver and located between the top screen and the bottom screen.

18 Claims, 17 Drawing Sheets

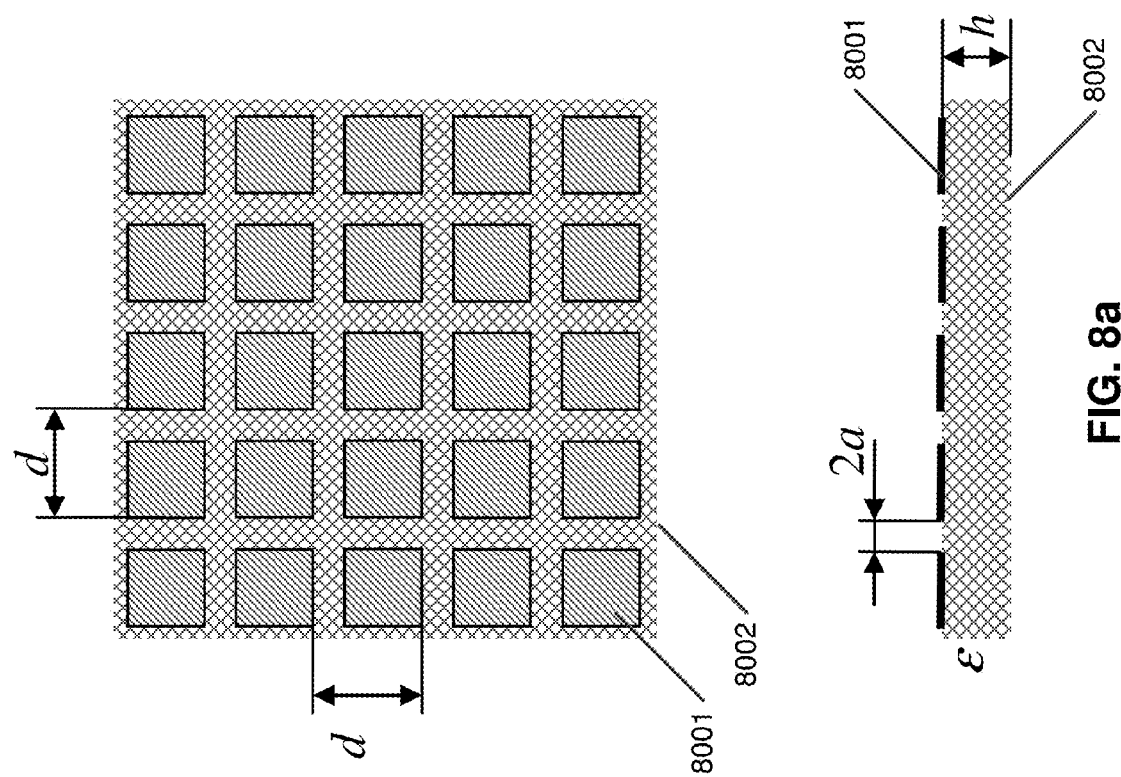

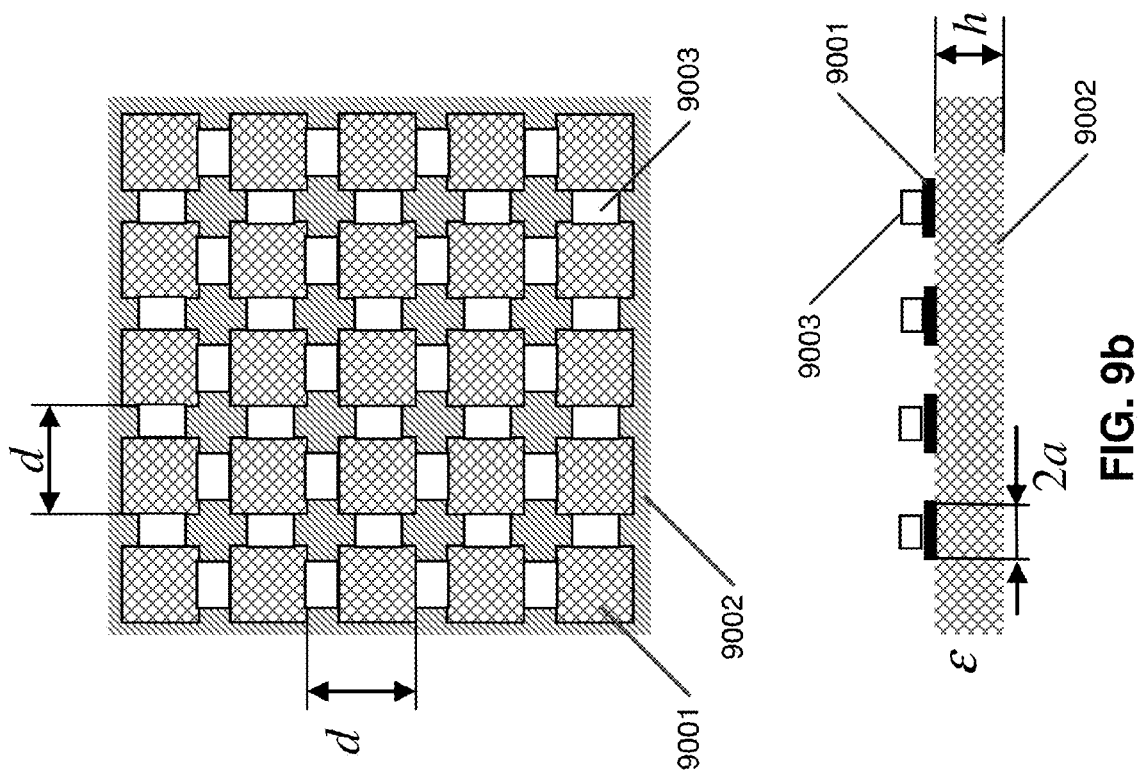

METHODS FOR MODELING MULTIPATH REFLECTIONS OF GNSS SIGNALS USING A TEST INSTALLATION AND APPARATUSES FOR IMPLEMENTING TEST METHODS

BACKGROUND OF THE INVENTION

The invention relates generally to radio-engineering and particularly, to test benches for radio-technical measurements and experiments with Global Navigation Satellite signals (GNSS) such as GPS, GLONASS, Galileo, Compass, QZSS.

Apparatuses of GNSS positioning and navigation may operate when in the line of sight there are any obstructions between a transmitting satellite antenna and a receiving antenna of the apparatus. Such obstacles include mountains, hills, buildings, bridges, tunnels, masts, electric lines, trees, bushes etc.

The obstacles can distort (weaken and alter) the original satellite signal.

When satellites move across the sky, the satellite signal deteriorates in tree tops and reflects many times from the bottom crown limit and the ground, thereby resulting in sharp and chaotic signal oscillations in phase and amplitude at the receiving antenna, as well as possible phase slips by 180 and over degrees.

Deteriorations in the original satellite signal cause malfunctions of positioning and navigation equipment. Such signal distortions at the output of the receiving antenna are equivalent to amplitude and phase distortions in the directional diagram (DD) of the receiving antenna. These oscillations distortions take the form of oscillations of the DD in terms of amplitude and phase versus satellite elevation. Amplitude and phase of oscillations are further described with the notions: amplitude and phase directional diagrams (DD) that show a dependence of amplitude $F(\theta)$[dB] and phase $\Phi(\theta)$[degree] for received signals on the direction of signal arrival.

The pattern of distorting the original satellite signal depends on the shape and size of shading obstacles and their properties (conductivity, humidity and so on).

In addition, some properties of the shading obstacles may abruptly and unpredictably change. The surface of these obstacles can also change its humidity and conductivity due to rain or snow. Tree crowns and bushes can change their shape due to the wind, affecting obstacle shape and position relative to the receiving antenna of the apparatus.

A separate type of distortions is one caused by multi-reflections of the original satellite signal. A signal from a satellite can pass through a semi-transparent obstacle, then reflect from the bottom part of the obstacle (for example, from leaves of the lower tree offshoots) towards the ground and finally reflect from the ground and so on.

Such reflections can be geometrically very complex. Different "replicas" of the original satellite signal are received by a receiving antenna of a positioning and navigation unit. These replicas are distorted in phase and amplitude both relative to the original signal and to each other.

To compare and debug operation of positioning systems when obstacles are available/unavailable, one needs to artificially create such signal distortions.

These are test benches that are used in radio engineering for investigating and modeling operation of positioning units with/without distortions caused by signal reflections.

U.S. Pat. No. 7,650,261 discloses a multi-path generating apparatus simulating echo signals being repeated at different delays to model reflections from objects and a method of utilizing such and apparatus. But such a generator does not allow to model distortions specific for multi-path reflections from semi-transparent obstacles.

There is known a method of developing test benches in the form of a vertically-installed conducting semi-plane (a metal plate) (P. Ya. Ufimtsev, Theory of Edge Diffraction in Electromagnetics, Tech Science Press, Encino, Calif., 2003).

Such an installation provides full blockage in a shadow zone of the semi-plane, as well as amplitude and phase distortions of the signal at the antenna output when the satellite moves from the full antenna blockage area caused by the semi-plane to the line-of-sight area between antenna and satellite, in the so-called transition zone.

However this method has the following disadvantages.

It does not allow amplitude and phase oscillations of the signal at the antenna output when the satellite angularly travels over the whole upper hemi-sphere.

The vertical size of a metal plate is about 10 meters which makes assembling and usage of the test bench inconvenient.

In addition, interaction of satellite signals with the metal plate strongly depends on satellite orientations relative to the plate.

For example, if the receiving antenna is located within illuminated zone of said metal plate, reflections from the metal plate affect the antenna (the so-called upper multipath). This multipath is partly filtered by the antenna based on polarization properties.

When the antenna is located in the shadow zone, an edge wave, excited by a metal plate edge, mainly contributes; and the signal of the edge wave quickly fades at setting the satellite in the shadow.

Therefore, the test bench in the form of the conducting semi-plane (metal plate) does not succeed in obtaining signal distortions shaped as sharp and multiple oscillations in the antenna DD in phase and amplitude which are relevant to multipath reflections from semi-transparent obstructions.

The same distortions, in particular, appear at locating the antenna under tree crowns/foliage.

The present invention aims development test radio engineering benches simulating characteristics of real obstructions causing multipath reflections and distortions of satellite signals.

SUMMARY OF THE INVENTION

The present invention is related to methods of producing test installations modeling multi-reflections of GNSS signals, apparatuses for implementing these methods and usage of the apparatuses that substantially obviates one or several of the disadvantages of the related art.

In one aspect of the invention, To simulate obstructions caused multipath reflections, test installations are proposed including a top screen semi-transparent for radio signals, and a reflecting bottom screen.

The semi-transparent screen can be shaped as a hemisphere, a cylindrical tunnel, a paraboloid, etc.

To develop/debug positioning algorithms for moving objects under shadowed conditions, test installations are proposed which have a semi-transparent top screen made as a semi-cylindrical tunnel in the interior of which a receiving antenna is being moved, and a reflecting bottom screen.

The top screen simulates a bottom surface of real semi-transparent obstructions (for example, foliage of bottom offshoots in the wood).

Slot and tape meshes with capacitive and resistive-capacitive impedance which are semi-transparent for radio signals can be used as top screen materials.

The reflective bottom screen imitates the underlying surface (ground) in case of real navigation and positioning applications.

Metalized foil, reflecting meshes etc are suitable materials for the reflective bottom screen When simulating satellite signals are multiply reflected between the semi-transparent top screen and reflecting bottom screen.

This imitation is similar to multi-path reflections of satellite signals in the cavity between the top surface of real obstructions and the real ground.

A test receiver represents a real positioning and navigation unit.

A receiving antenna of the test receiver is placed in the cavity between the semi-transparent top screen and reflecting bottom screen.

By placing the receiving antenna of the test receiver between the semi-transparent top screen and reflecting bottom screen of the test installation, one can obtain distortions equivalent to those in field tests with real obstructions.

In simulation, the receiving antenna of the test receiver receives the original satellite signals and their reflected "replicas" distorted in phase and amplitude.

Parameters of these distortions depend on characteristics of the top and bottom screens (shape, dimensions, material), as well as on a position of the receiving antenna in the cavity between the screens.

By combining and selecting the parameters of the top and bottom screens, one can achieve distortion parameters needed for a particular test program or experiments.

A computational correlation between screen and distortions parameters is given hereafter.

Actual operational conditions of positioning and navigation equipment in a number of environments can be simulated by combining and selecting distortion parameters.

Test installations built on the proposed method enable new positioning and navigation units to be tested and evaluated.

The method allows an improvement in methods of processing satellite signals without making field tests with actual obstructions.

In addition, the method makes it possible to have "reference" and stable distortions independent of weather, climate and other environmental conditions.

The latter is very important for performing accurate repeated measurements (calibration).

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings:

FIG. 1 shows a diagram of multi-reflections for satellite signals between lower obstruction part (foliage) and the ground.

FIG. 2 shows a test installation with a semi-spherical top screen, where: 2001 is the antenna; 2002 is the top semi-spherical screen; 2003 is the bottom reflecting screen; R is the radius of the top screen; H is the antenna height (2001) above the bottom screen; L is the projections of the bottom screen (2003) over the limit of the top screen (2002).

calculated based on expression (F3).

Figure 6:
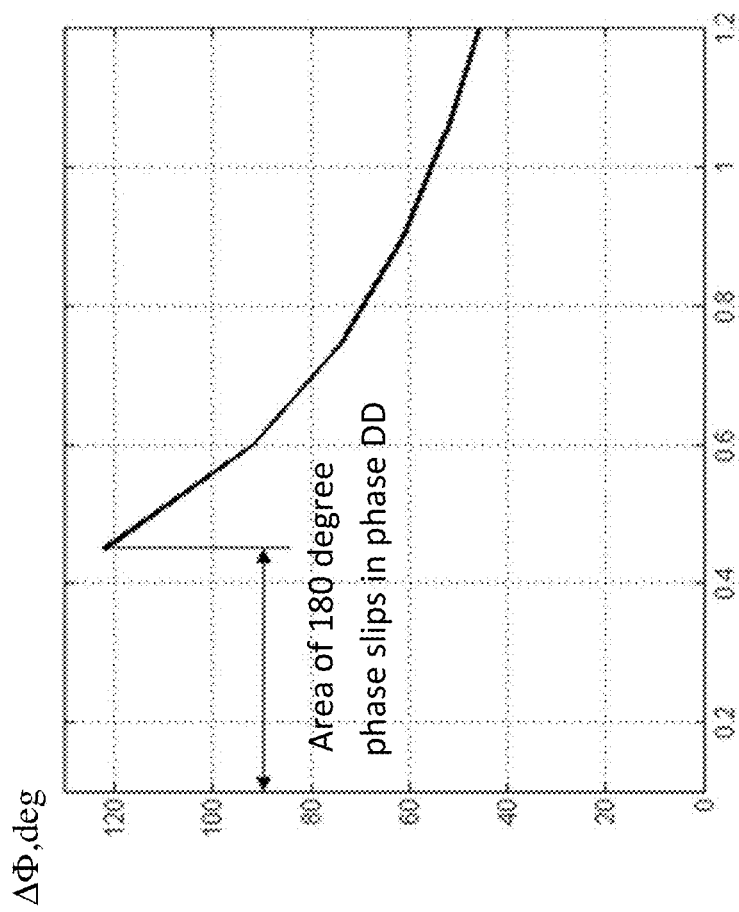

FIG. 6 shows a dependence of oscillations depth $\Delta\Phi$ in degrees in phase DD on the impedance module normalized to the free-space characteristic impedance $$\left|\frac{Z_s}{W_0}\right|.$$

Figure 7A:
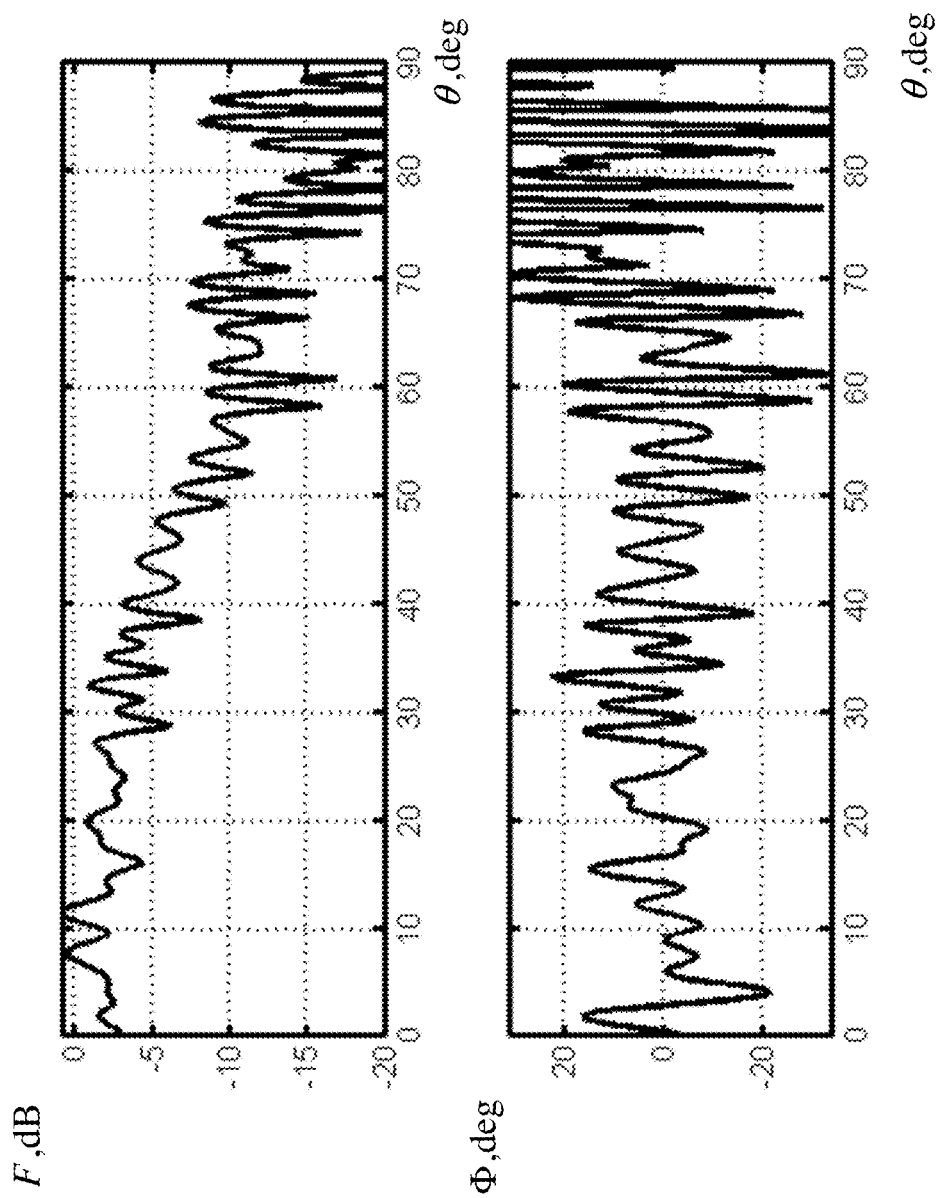

FIG. 7a presents amplitude and phase directional diagrams for example 1.

Figure 7B:
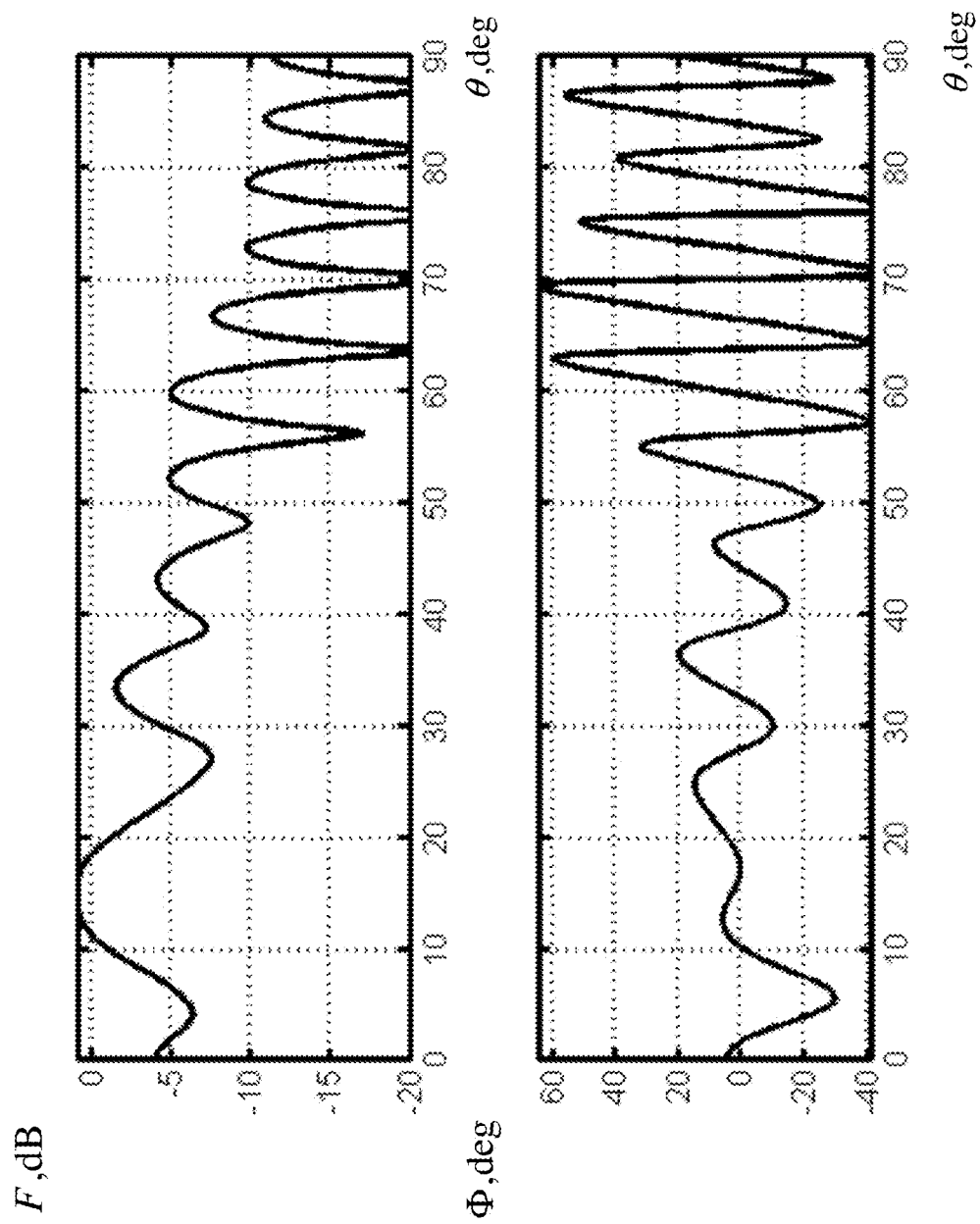

FIG. 7b presents amplitude and phase directional diagrams for example 2.

Figure 7C:
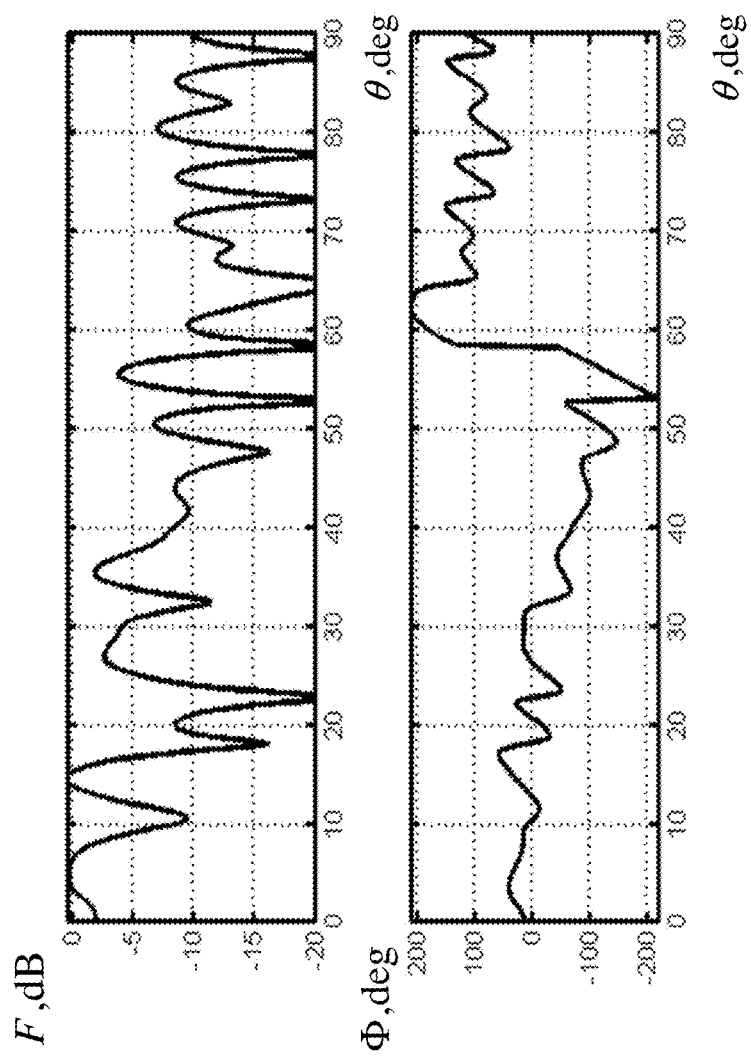

FIG. 7c presents amplitude and phase directional diagrams for example 3.

Figure 7D:
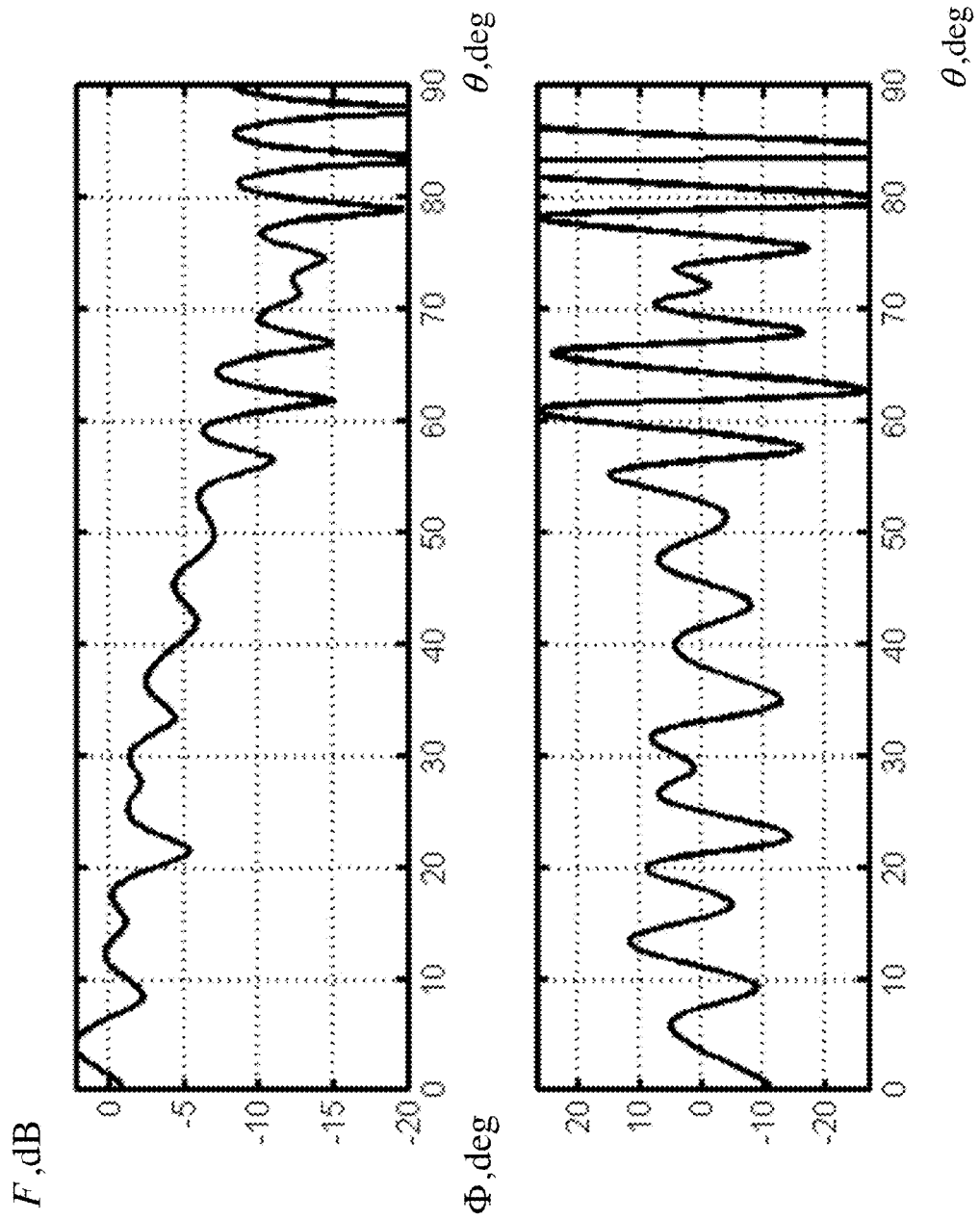

FIG. 7d presents amplitude and phase directional diagrams for example 4.

Figure 7E:
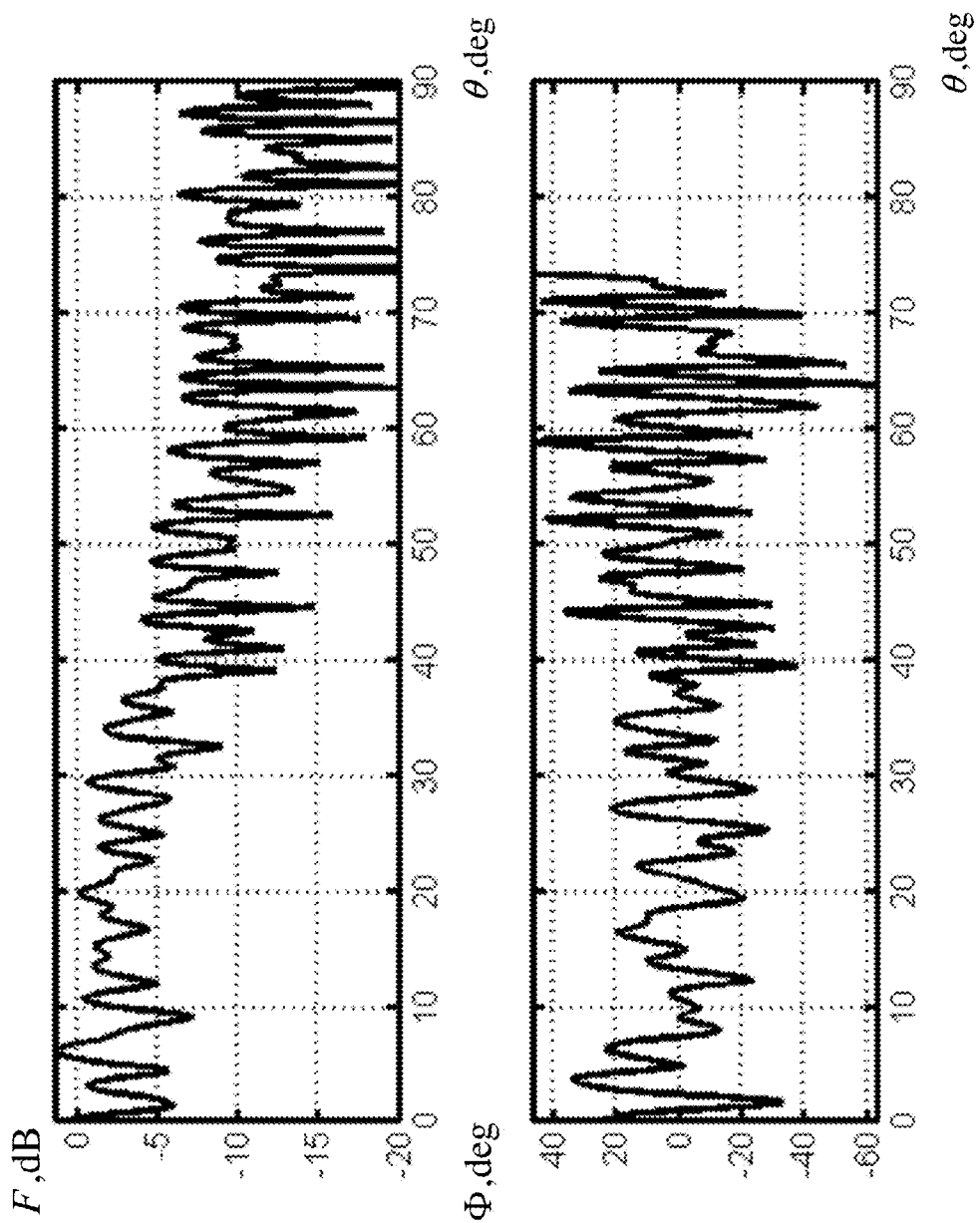

FIG. 7e presents amplitude and phase directional diagrams for example 5.

FIG. 8a shows a possible design of slot mesh with capacitive impedance, where: 8001 is the metallized squares separated by slots forming a slot structure; 8002 is the dielectric substrate; d is the period of the slot structure; 2a is the width of the slot; h is the thickness of the substrate.

Figure 8B:
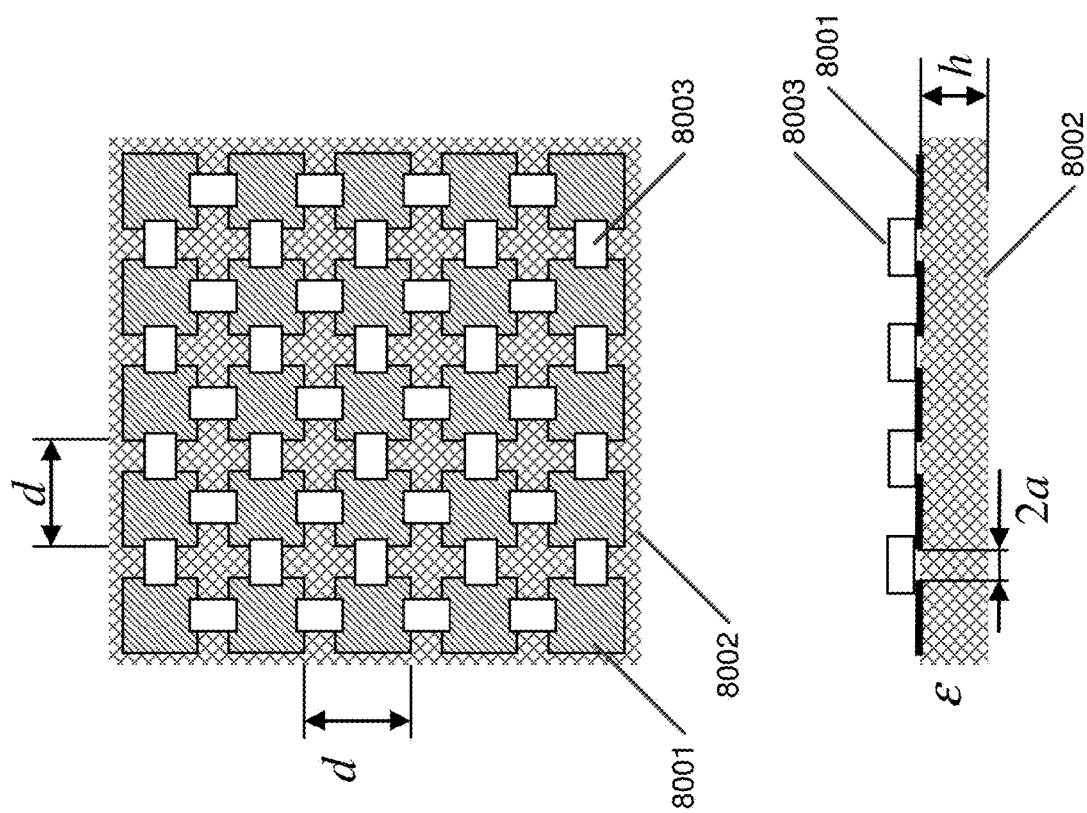

FIG. 8b shows a possible design of slot mesh with resistive-capacitive impedance, where: 8001 is the metallization squares separated by slots forming a slot structure; 8002 is the dielectric substrate; 8003 is the resistor; d is the period of the slot structure; 2a is the width of the slot; h is the thickness of the substrate.

Figure 9A:
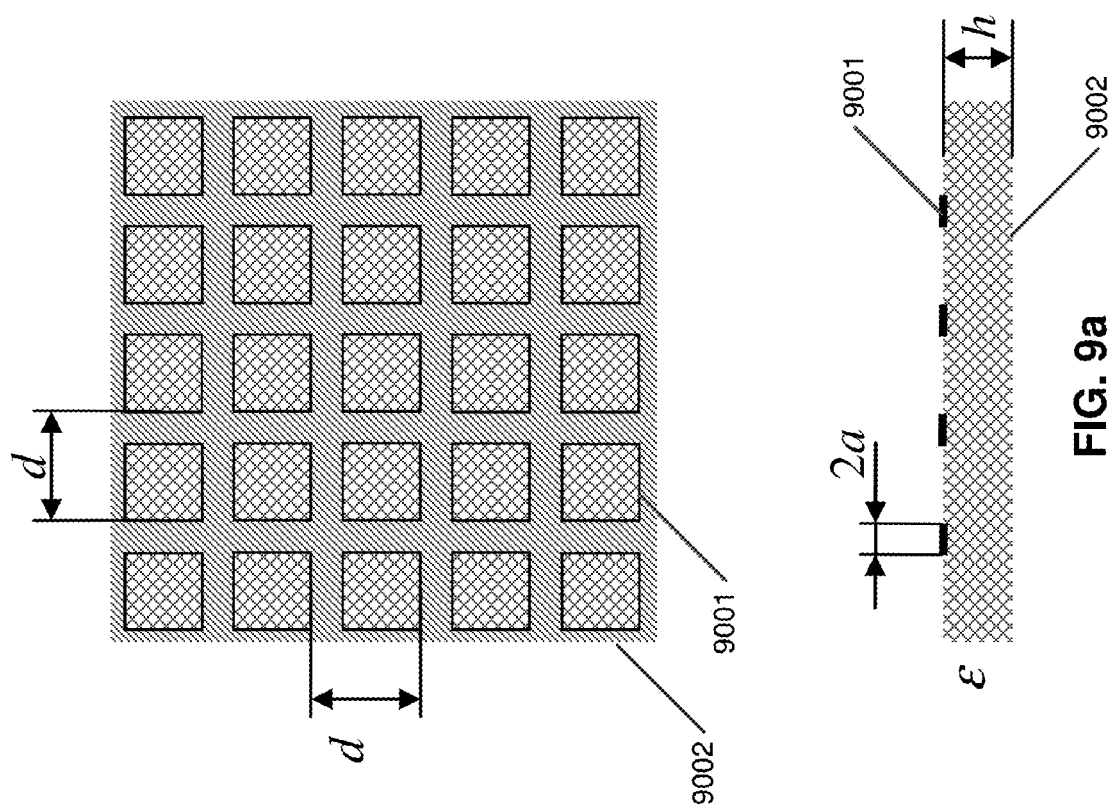

FIG. 9a shows a possible design of tape mesh with inductive impedance, where: 9001 is the metallized tapes; 9002 is the dielectric substrate; d is the period of the tape structure; 2a is the width of the tape; h is the thickness of the substrate.

FIG. 9b shows a possible design of tape mesh with resistive-inductive impedance, where: 9001 is the metallized tapes; 9002 is the dielectric substrate; 9003 is the resistor; d is the period of the tape structure; 2a is the width of the tape; h is the thickness of the substrate.

Figure 10:
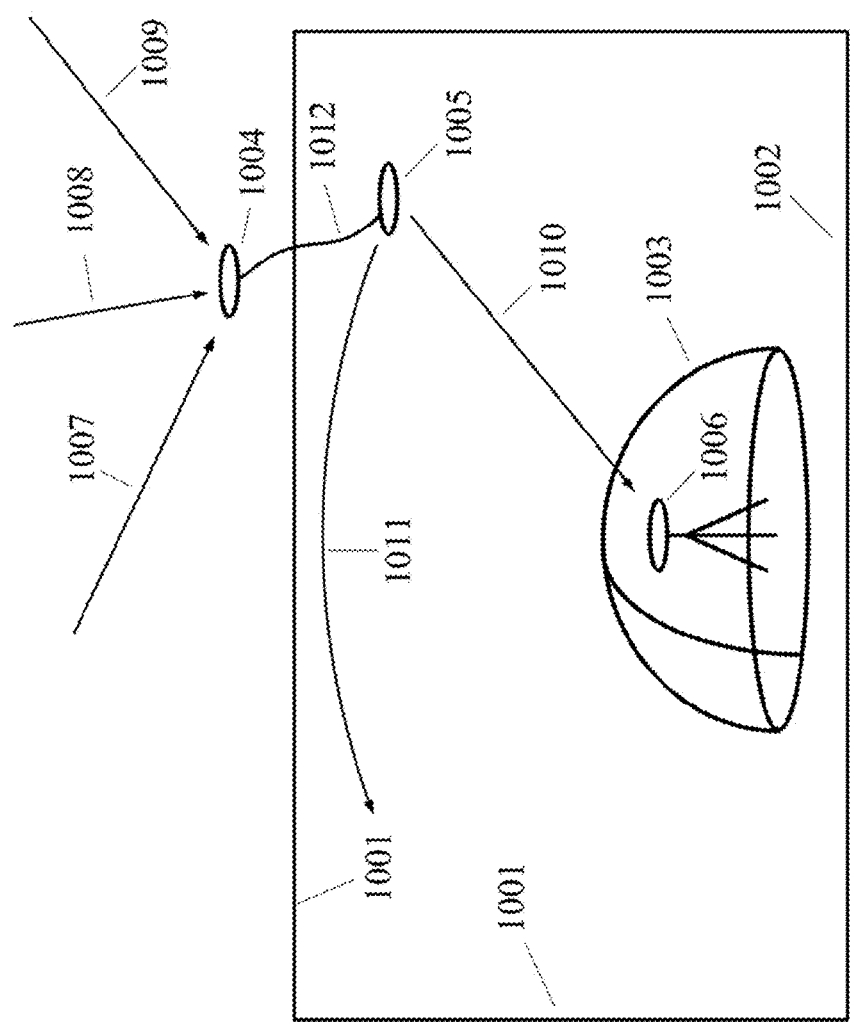

FIG. 10 shows a variant of using the test installations with a anechoic chamber, where: 1001 are walls and ceiling of the anechoic chamber; 1002 is the floor of anechoic chamber; 1003 is the top screen; 1004 is the external receiving antenna; 1005 is the radiating antenna; 1006 is the receiving antenna; 1007, 1008, 1009 are the directions to satellites;

1010 is the direction to the radiating antenna; 1011 is the trajectory of traveling the radiating antenna; 1012 is the cable.

Figure 11:
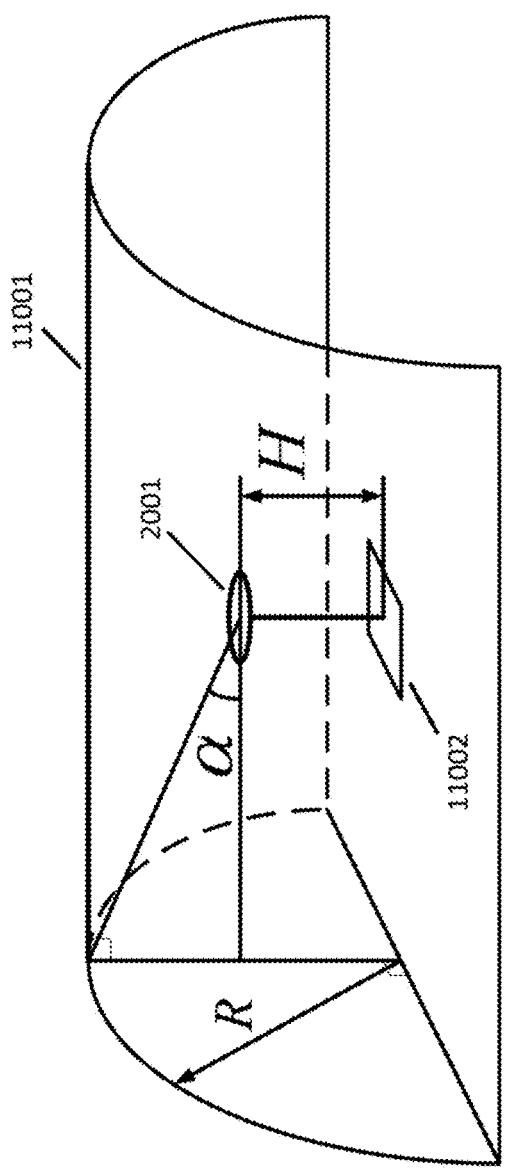

FIG. 11 shows a test installation with a top "tunnel"-shaped screen (the bottom reflecting screen is not shown); where: 2001 is the antenna; 11001 is the top "tunnel"-shaped screen; R is the radius of the top screen; H is the antenna (2001) height over the bottom screen; a is the angle between the ray from the antenna to the uppermost point of the top screen and direction to the horizon; 11002 is the movable platform with the fixed antenna.

DETAILED DESCRIPTION OF THE PREFERRED EMBODIMENTS

Reference will now be made in detail to the preferred embodiments of the present invention, examples of which are illustrated in the accompanying drawings.

It is common practice for antenna engineering to describe antenna characteristics in the transmitting mode.

The reciprocity theorem states the equivalence of directional diagrams for receiving and transmitting modes.

For the sake of computation and simulation, distortions of received signals are equivalent to those of directional diagrams (amplitude DD and phase DD) for the receiving antenna of the test receiver.

Actual obstructions (similar to trees) are equivalent to sharp oscillations in amplitude and phase in DD.

The distortions are characterized by DD minimal angular oscillation period $T_\theta$[deg], oscillations depth of the amplitude DD $\Delta F$[dB], and oscillations depth in the phase DD $\Delta \Phi$[deg].

The satellite signal is the electromagnet wave that interacts with the screen.

Parameters of such interaction (degree of reflection and passage through the screen) are described by a value called "layer impedance" (in radio engineering, called $Z_S$).

By varying $Z_S$ one can provide a desirable degree of signal reflection, absorption and passage through the mesh.

Elevation angle $\theta$ varies from 0 to 90 degrees, the angle 0 degree corresponding to the zenith direction and 90 degrees—the horizon direction.

A minimal antenna height over the bottom reflecting screen is 0.4 radius of the top screen.

The bottom reflecting screen can be made from metal or metallized foil (sheet), and metal mesh with mesh period $d_3 < 0.2\lambda$ and conductor diameter $2r_3 > 0.012\lambda$.

To reduce effects of the top screen, the mesh projects over the obstruction edge by distance L within range $0 < L < 5\lambda$.

Calculation of Geometric Parameters and Impedance for the Screen

Approximate expressions (F1-F6) are applied to calculation of geometric parameters and impedance for the top semi-transparent screen.

A dependence of DD minimal angular oscillation period on the ratio of the screen radius to wavelength $T_\theta$ is approximately described by (F1).

$$T_\theta = (50 \pm 5)\frac{\lambda}{R}, deg \qquad (F1)$$

where: R is the radius of hemi-spherical top screen; $\lambda$ is the wavelength. Note that the top screen need not need be a perfect hemisphere, and other shapes (e.g., paraboloids, hyperboloids and so on) will work as well (although the mathematics become more complex).

A working range of the screen radius is a range of $R/\lambda = 5 \ldots 30$.

In this case DD angular oscillations are realized with period $T_\theta = 1.5 \ldots 11$ deg.

Figure 1:
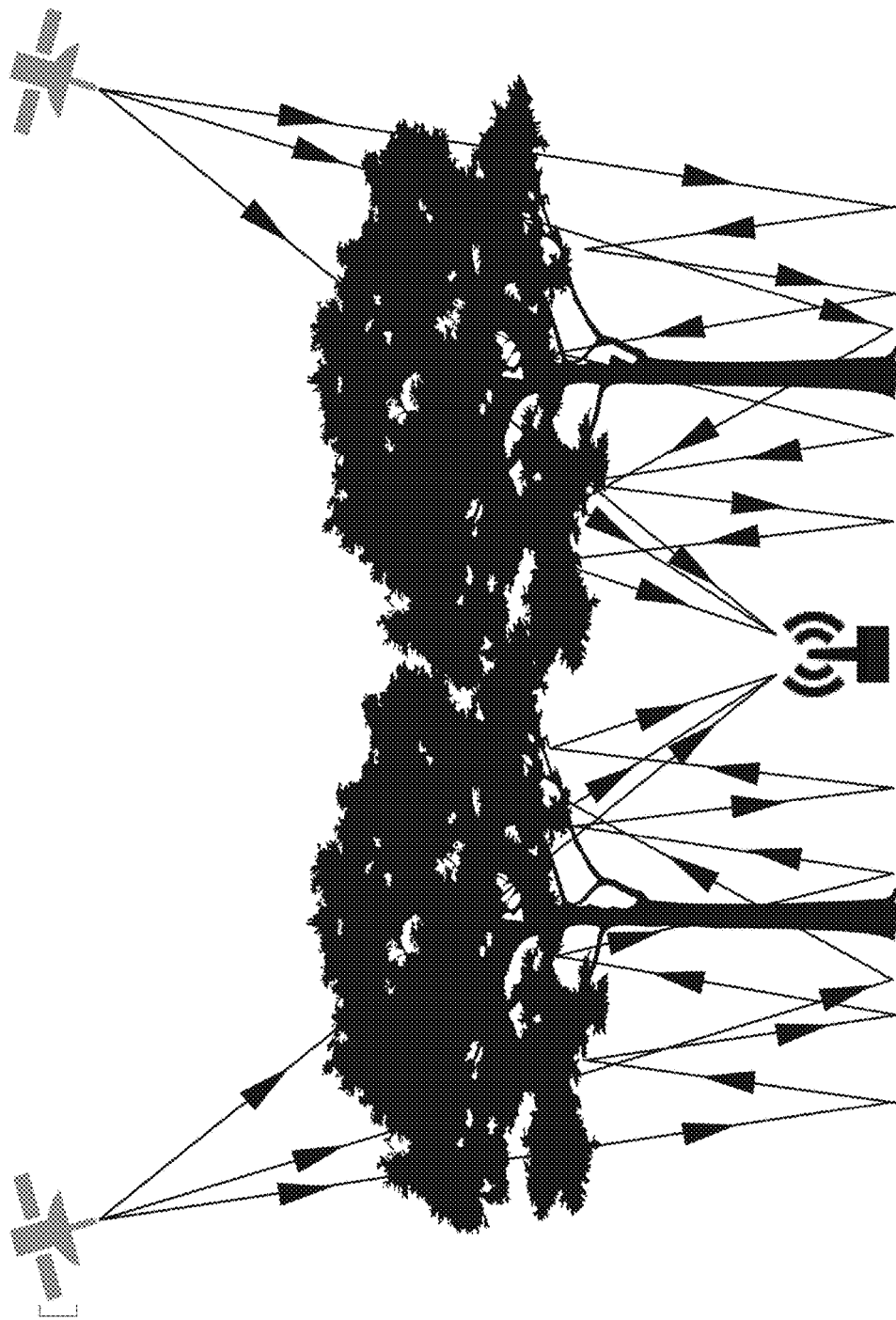
Figure 2:
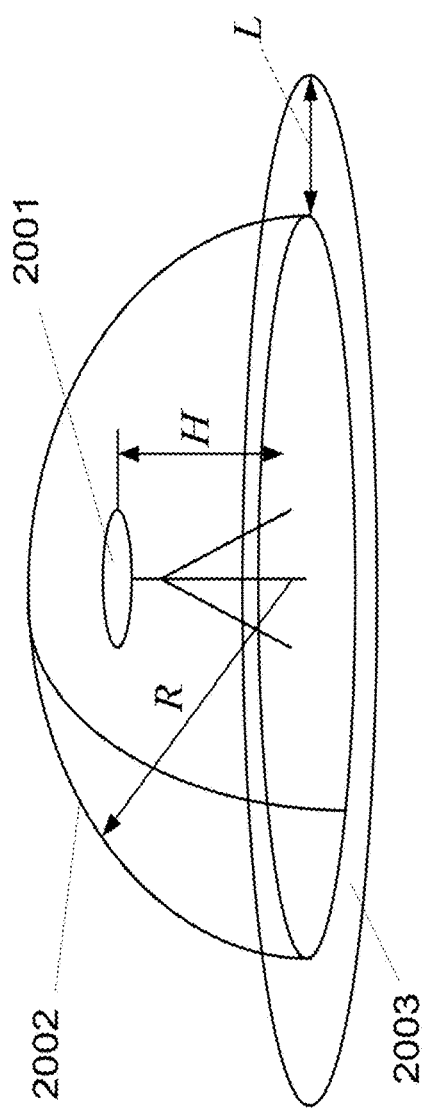
Figure 3:
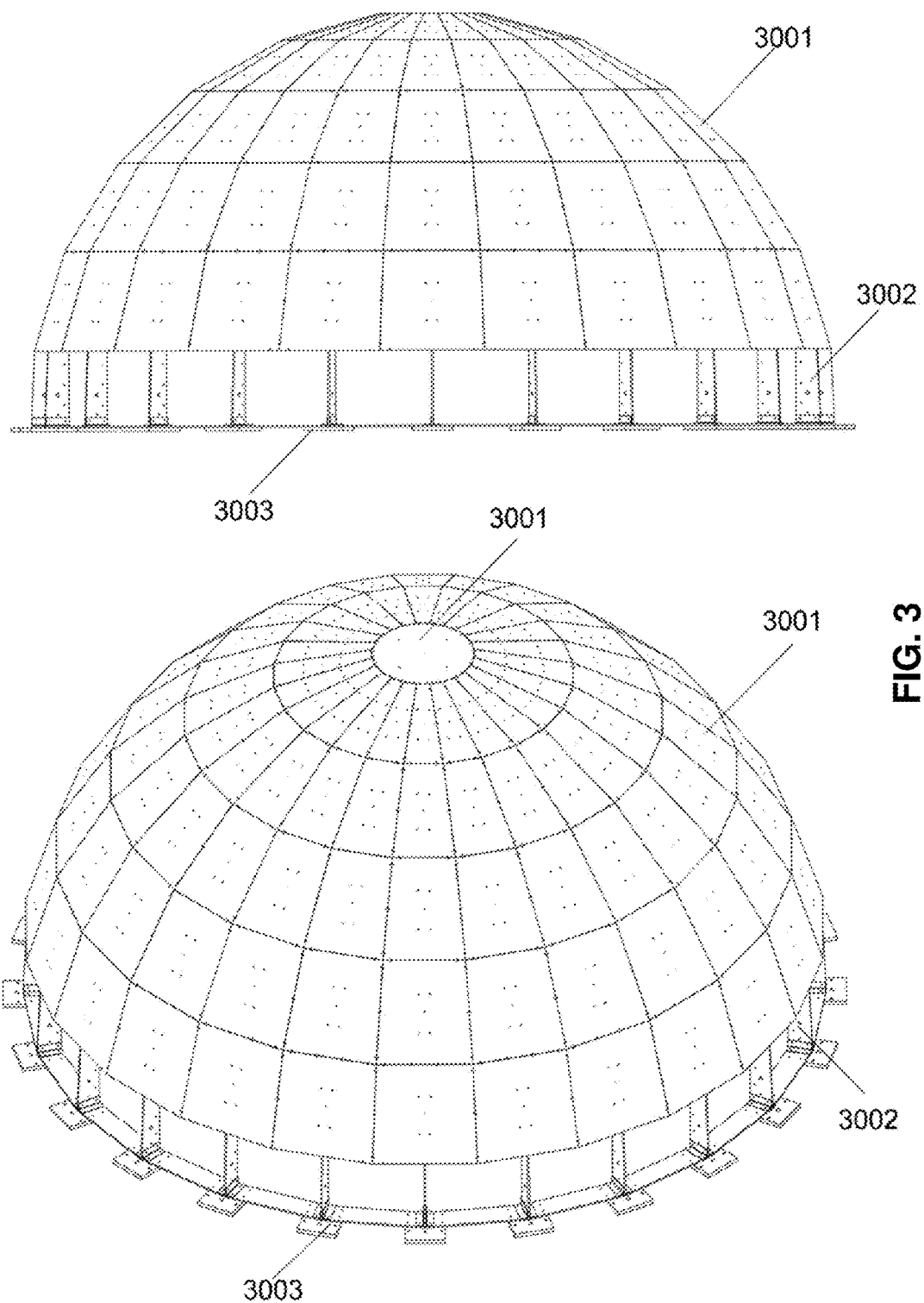
FIG. 3 shows an embodiment of the top semi-spherical screen, where: 3001 are printed circuit boards (PCB) with etched slot or tape meshes (with/without soldered resistors); 3002 is the dielectric frame to fix PCB 3001; 3003 is the fixtures to attach the dielectric frame 3002 to the ground.
Figure 4:
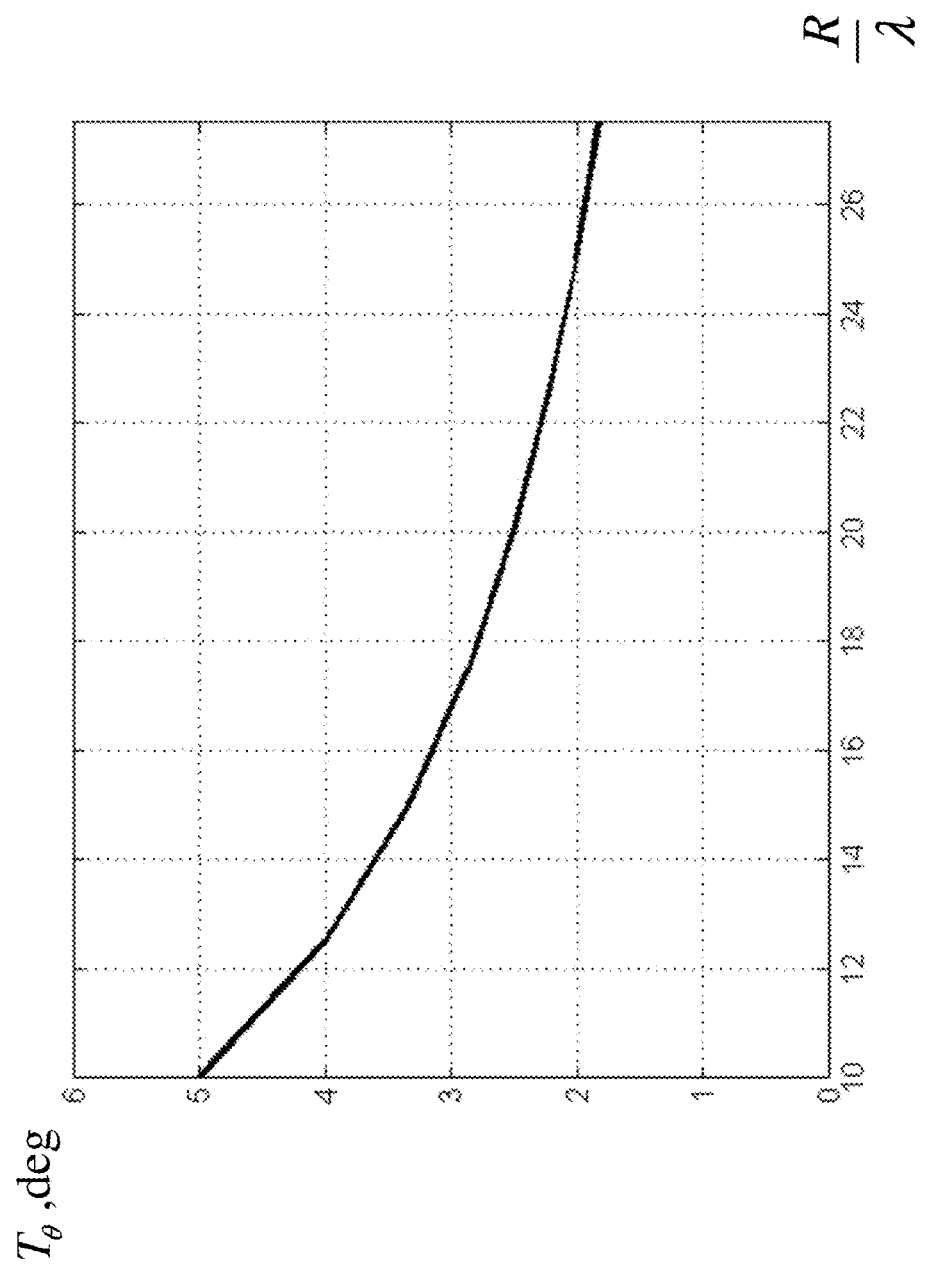
FIG. 4 shows a dependence of a minimal possible oscillation period relative to elevation angle $T_\theta$ in degrees on the ratio of the screen radius R to the wavelength computed according to (F1).

FIG. 4 presents a dependence of minimal period of oscillations relative to elevation angle $T_\theta$ in degrees on the ratio of the screen radius R to the wavelength. The dependence has been determined in accordance with expression (F1).

Expression (F2) follows from (F1) and allows the determination of the required screen radius R on the basis of the assigned minimal period of angular oscillations $$T_\theta: \frac{R}{\lambda} = (50 \pm 5)\frac{1}{T_\theta} \qquad (F2)$$

A dependence of amplitude DD oscillations depth $\Delta F$ on screen impedance module normalized to free space characteristic impedance $$\left|\frac{Z_s}{W_0}\right|$$

is approximately described by expression (F3):

$$\Delta F = 20 \cdot lg\left((0.5 \pm 0.05)\left|\frac{Z_s}{W_0}\right|\right), dB \qquad (F3)$$

where:

$$\left|\frac{Z_s}{W_0}\right|$$

is the screen module normalized to free space characteristic impedance; lg(10) is the base 10 logarithm.

Figure 5:
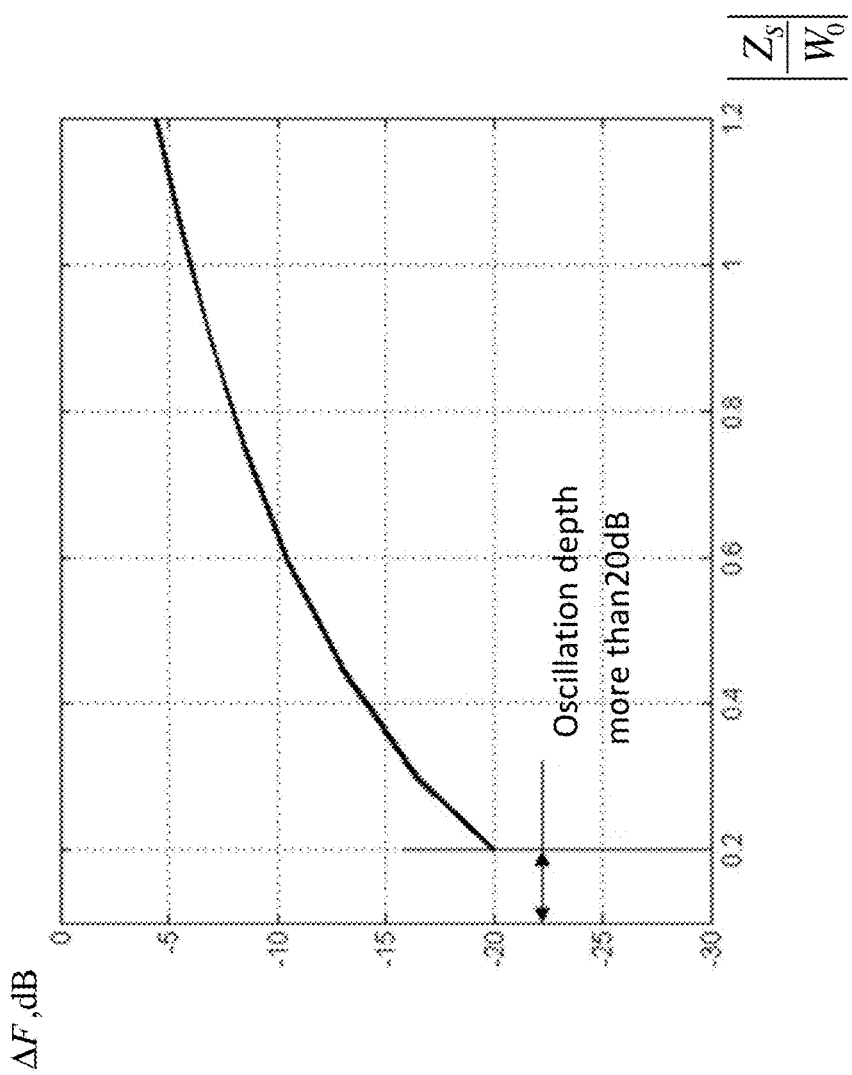
FIG. 5 shows a dependence of oscillations depth in the amplitude DD $\Delta F$ in dB on impedance module/magnitude of the screen normalized to the free-space characteristic impedance $$\left|\frac{Z_s}{W_0}\right|$$

A dependence of amplitude DD oscillations depth $\Delta F$ measured in dB on screen impedance module normalized to free space characteristic impedance $$\left|\frac{Z_s}{W_0}\right|$$

calculated according to expression (F3) is shown in FIG. 5.

An operating range of screen impedance module is approximately equal to $$\left|\frac{Z_S}{W_0}\right| = 0.1 \ldots 1.2$$

In the range of screen impedance module $$\left|\frac{Z_S}{W_0}\right| = 0.1 \ldots 0.2$$

amplitude oscillations of DD with depth $|\Delta F| > 20$ dB are implemented.

In the range of screen impedance module $$\left|\frac{Z_S}{W_0}\right| = 0.2 \ldots 1.2$$

amplitude oscillations of DD with depth $|\Delta F|=20 \ldots 4$ dB are implemented.

Expression (F4) follows from (F3), it allows to determine a required screen impedance module $$\left|\frac{Z_S}{W_0}\right|$$

on the basis of the assigned amplitude DD oscillations depth $\Delta F$:

$$\left|\frac{Z_S}{W_0}\right| = (2 \pm 0.2)10^{-0.05|\Delta F|} \quad (F4)$$

Expression (F5) approximately describes a dependence of phase DD oscillations depth $\Delta\Phi$ on screen impedance module normalized to free space characteristic impedance $$\left|\frac{Z_S}{W_0}\right|: \Delta\Phi = (55 \pm 5)\left|\frac{W_0}{Z_S}\right|, deg \quad (F5)$$

Expression (F5) is valid in the range of $$\left|\frac{Z_S}{W_0}\right| \geq 0.45.$$

Within this range of the screen impedance module there are phase oscillations of DD with depth $\Delta\Phi=40 \ldots 120$ deg.

For the range of impedance module $$\left|\frac{Z_S}{W_0}\right| = 0.1 \ldots 0.45$$

expression (F5) is not applicable, since phase DD shows 180 phase slips in this range.

Artificial obstructions caused 180 phase slips in phase DD are also of interest, as they are similar to strong shading from real obstructions, and result in irregular/dissected amplitude and phase DD.

A dependence of phase DD oscillations depth $\Delta\Phi$ in degrees on screen impedance module normalized to free space characteristic impedance $$\left|\frac{Z_S}{W_0}\right|$$

obtained from (F5) is shown in FIG. 6).

Expression (F6) follows from (F5), which enables the required screen impedance module $$\left|\frac{Z_S}{W_0}\right|$$

to be determined from the assigned DD phase oscillations $\Delta\Phi$:

$$\left|\frac{Z_S}{W_0}\right| = (55 \pm 5)\frac{1}{\Delta\Phi} \quad (F6)$$

Let us consider different examples of the proposed methods to calculate different parameters of the top semi-transparent spherical screen causing needed amplitude and phase distortions, as well as an angular period of DD oscillations.

Example 1

The task is to create a test installation capable of producing oscillations with period $T_\theta=3$ degrees, and amplitude oscillations depth $\Delta F=7$ dB.

According to (F2), calculate the required radius of the top screen R:

$$\frac{R}{\lambda} = 50\frac{1}{T_\theta} = 50\frac{1}{3} = 16.6$$

According to (F4) and considering requirements for amplitude DD oscillations depth, calculate the needed impedance of the top screen $Z_S$:

$$\left|\frac{Z_S}{W_0}\right| = 2 \cdot 10^{0.05\Delta F} = 2 \cdot 10^{0.05 \cdot (-7)} = 0.89$$

Then from (F5) for screen impedance module $$\left|\frac{Z_S}{W_0}\right| = 0.89$$

calculate phase DD oscillations depth:

$$\Delta\Phi = 55\left|\frac{W_0}{Z_S}\right| = 55 \cdot 0.89 = 61.8 \; deg$$

Amplitude and phase directional diagrams calculated in example 1 are shown in FIG. 7a).

Example 2

The task is to create a test installation capable of producing oscillations with period $T_\theta=7$ deg and phase oscillations depth $\Delta\Phi=80$ deg.

According to (F2), calculate the required radius of the top screen R:

$$\frac{R}{\lambda} = 50\frac{1}{T_\theta} = 50\frac{1}{7} = 7.1$$

According to (F6) and considering requirements for phase DD oscillations depth, calculate the needed impedance of the screen $Z_S$:

$$\left|\frac{Z_S}{W_0}\right| = 55\frac{1}{\Delta\Phi} = 55\frac{1}{80} = 0.69$$

From (F3) calculate amplitude DD oscillations depth for the screen impedance $$\text{module}\left|\frac{Z_S}{W_0}\right| = 0.69: \Delta F = 20\ \lg\left(0.5\left|\frac{Z_S}{W_0}\right|\right) = 20\ \lg(0.5 \cdot 0.69) - 9.2\ \text{dB}$$

Amplitude and phase directional diagrams calculated in example 2 are shown in FIG. 7b).

Example 3

The task is to create a test installation capable of producing oscillations with period $T_\theta=5$ deg and 180-degree phase slips.

According to (F2), calculate the required radius of the top screen R:

$$\frac{R}{\lambda} = 50\frac{1}{T_\theta} = 50\frac{1}{5} = 10$$

According to (F6) and considering requirements for availability of 180-degree phase slips in phase DD, select an impedance module from the range $$\left|\frac{Z_S}{W_0}\right| = 0.1\ ...\ 0.45: \left|\frac{Z_S}{W_0}\right| = 0.4$$

From (F3) one can calculate amplitude DD oscillations depth for impedance module $$\left|\frac{Z_S}{W_0}\right| = 0.4: \Delta F = 20\ \lg\left(0.2\left|\frac{Z_S}{W_0}\right|\right) = 20\ \lg(0.5 \cdot 0.4) = -14\ \text{dB}$$

Amplitude and phase directional diagrams calculated in example 3 are shown in FIG. 7c).

Example 4

This example relates to calculating amplitude and phase DD for a screen with radius $R=10\lambda$ and impedance of the screen material $$\left|\frac{Z_S}{W_0}\right| = 1.1.$$

According to (F3) one calculates that the depth of amplitude drops is within $\Delta F=-(4.4\ ...\ 6.1)$dB.

From (5) phase error is within a range of $$\frac{\Delta\Phi}{2} = \frac{45\ ...\ 54}{2} = 23\ ...\ 27\ deg.$$

The calculated angular oscillations period is $T_\theta=5$ deg.

Amplitude and phase directional diagrams calculated in example 4 are shown in FIG. 7d.

This set of parameters for the top screen corresponds to slightly distorted satellite signals.

Example 5

This example relates to calculating amplitude and phase DD for a screen with radius $R=25\lambda$ and screen impedance $$\left|\frac{Z_S}{W_0}\right| = 0.6.$$

According to (F3) one calculates that the depth of amplitude drops is within $\Delta F=-(9.6\ ...\ 11.3)$dB.

From (5) phase error is within a range of $$\frac{\Delta\Phi}{2} = \frac{83\ ...\ 100}{2} = 41\ ...\ 50\ deg.$$

The calculated angular oscillations period is $T_\theta=5$ deg.

Amplitude and phase directional diagrams calculated are shown in FIG. 7d.

Amplitude and phase directional diagrams calculated in example 5 are shown in FIG. 7e.

This set of parameters for the top screen corresponds to strongly distorted satellite signals with interruptions of separate satellites.

For manufacturing the top semi-transparent tunnel-shaped screen, taking into account blockage of open sky by the obstruction, angle α between a ray from the antenna at height H to the top upper point of the top screen and the horizon directions is to be no more than 30 deg.

In this case expressions F1-F6 are still valid.

Calculation of Parameters for Screen Material

There are known methods of developing surfaces (coatings) with different layer impedance $Z_S$ by applying slot and tape meshes.

There is no analytic dependence of slot and tape meshes on impedance, hence the parameters of the meshes can be determined only by selecting with the help of expressions (F7, F8), and known dependences of mesh impedance on mesh material parameters.

Slot Mesh

Slot meshes can have resistive and resistive-capacitive impedance. A possible design of the slot mesh with capacitive impedance is shown in FIG. 8a.

FIG. 8b presents a possible design of slot mesh with resistive-capacitive impedance. If there are no resistors soldered to slots, impedance Zs is equal to the self-impedance of the slot structure:

$$Z_S = Z_S^s \qquad (F7)$$

When resistors with resistance R are soldered to slots, impedance $Z_S$ is determined according to:

$$Z_S = \frac{1}{1/Z_S^s + 1/R} \qquad (F8)$$

Impedance of slot mesh for given mesh parameters is determined according to:

$$\frac{Z_S^s}{W_0} = \frac{C\frac{a\pi}{d}}{1 - C\frac{a\pi}{d}} \quad \text{(F9)}$$

where:

$$C = \frac{2}{\frac{a\pi}{d}\sum_{n=-\infty}^{\infty} J_0^2\left(\frac{2\pi n a}{d}\right)\frac{k_1}{k_{zn1}}\left(1 + \frac{\cos k_{zn2}h - i\frac{K_{n1}}{K_{n2}}\sin k_{zn2}h}{\cos k_{zn2}h - i\frac{K_{n2}}{K_{n1}}\sin k_{zn2}h}\right)};$$

$$K_{n1} = W_1 \frac{k_{zn1}}{k_1};$$

$$K_{n2} = W_2 \frac{k_{zn2}}{k_2};$$

$$K_{n1} = \frac{1}{W_1}\frac{k_{zn1}}{k_1};$$

$$K_{n2} = \frac{1}{W_2}\frac{k_{zn2}}{k_2};$$

$$k_{zn1} = \sqrt{k_1^2 - \left(\frac{2\pi n}{d}\right)^2};$$

$$k_{zn2} = \sqrt{k_2^2 - \left(\frac{2\pi n}{d}\right)^2};$$

$$k_1 = \frac{2\pi}{\lambda};$$

$$k_2 = \sqrt{\varepsilon}\frac{2\pi}{\lambda};$$

$$W_1 = W_0 = 120\pi;$$

$$W_2 = \frac{1}{\sqrt{\varepsilon}}W_0 = \frac{1}{\sqrt{\varepsilon}}120\pi;$$

$J_0()$ is the Bessel function of $0^{th}$ order; $i$ is the square root of $-1$; $\lambda$ is the wavelength; $2a$ is the slot width; $d$ is the period of the slot mesh; $h$ is the thickness of the dielectric substrate; $\in$ is the dielectric permeability of the substrate.

Let us consider an example of the proposed method to calculate material parameters for the top semi-transparent spherical screen produced of a slot mesh. This screen provides predicted amplitude and phase distortions and angular period of oscillations for directional diagrams.

Example 6

This example relates to calculating parameters for slot mesh with impedance $$\frac{Z_S}{W_0} = -0.7i$$

at frequency f=1390 MHz (at $$\left(\text{at } \lambda = \frac{3 \cdot 10^8}{f} = \frac{3 \cdot 10^8}{1390 \cdot 10^6} = 0.21 \text{ m}\right).$$

One of possible parameter sets corresponding to the assigned impedance is calculated with (F7) by adjusting parameters:

2a=1.5 mm; d=19 mm; h=1.5 mm; ∈=3.2

The value of impedance is $$\frac{Z_S}{W_0} = \frac{Z_S^s}{W_0} = -0.704i$$

Tape Mesh

Mesh tapes can have inductive and resistive-inductive impedance. A possible design of the tape mesh with inductive impedance is shown in FIG. 9a.

A possible design of the tape mesh with resistive-inductive impedance is shown in FIG. 9b. If there are no resistors soldered to tapes, impedance Zs is equal to the self-impedance of the tape structure:

$$Z_S = Z_S^t \quad \text{(F10)}$$

When resistors with resistance R are soldered to the tape, impedance $Z_S$ is determined according to:

$$Z_S = Z_S^t + R \quad \text{(F11)}$$

Impedance of the mesh tape for the given mesh parameters is determined according to (F12):

$$\frac{Z_S^t}{W_0} = -\frac{1}{2}\left(\frac{1}{R} + 1\right) \quad \text{(F12)}$$

where:

$$R = \frac{\left((K_{02}^2 - K_{01}^2) + C\frac{a\pi}{d}K_{01}\right)i\sin(k_{z02}h) - C\frac{a\pi}{d}K_{02}\cos(k_{z02}h)}{2K_{01}K_{02}\cos(k_{z02}H_1) - i(K_{02}^2 + K_{01}^2)\sin(k_{z02}h)};$$

$$C = \frac{2K_{01}\frac{K_{02}\cos k_{z02}h - iK_{01}\sin k_{z02}h}{2K_{01}K_{02}\cos k_{z02}h - i\sin k_{z02}h(K_{02}^2 + K_{01}^2)}}{\frac{a\pi}{d}\sum_{n=-\infty}^{\infty}\left(J_0\left(\frac{2an\pi}{d}\right)\right)^2 \frac{K_{n2}\cos k_{zn2}h - iK_{n1}\sin k_{zn2}h}{2K_{n1}K_{n2}\cos k_{zn2}h - i(K_{n2}^2 + K_{n1}^2)\sin k_{zn2}h}};$$

$$K_{n1} = \frac{1}{W_1}\frac{k_{zn1}}{k_1};$$

$$K_{n2} = \frac{1}{W_2}\frac{k_{zn2}}{k_2};$$

$$K_{01} = \frac{1}{W_1};$$

$$K_{02} = \frac{1}{W_2};$$

$$k_{zn1} = \sqrt{k_1^2 - \left(\frac{2\pi n}{d}\right)^2};$$

$$k_{zn2} = \sqrt{k_n^2 - \left(\frac{2\pi n}{d}\right)^2};$$

$$k_{z01} = k_1;$$

$$k_{z02} = k_2;$$

$$k_1 = \frac{2\pi}{\lambda};$$

$$k_2 = \sqrt{\varepsilon}\frac{2\pi}{\lambda};$$

$$W_1 = W_0 = 120\pi;$$

$$W_2 = \frac{1}{\sqrt{\varepsilon}}W_0 = \frac{1}{\sqrt{\varepsilon}}120\pi$$

$J_0()$ is the Bessel function of $0^{th}$ order; i is the square root of −1; λ is the wavelength; 2a is the tape width; d is the period of the tape mesh; h is the thickness of the dielectric substrate; ∈ is the dielectric permeability of the substrate.

Let us consider an example of the proposed method to calculate material parameters for the top semi-transparent spherical screen produced of a mesh tape. This screen provides predicted amplitude and phase distortions and angular period of oscillations for directional diagrams.

Example 7

This example relates to calculating parameters for mesh tape with impedance $$\frac{Z_S}{W_0} = 0.7i$$

at frequency f=1390 MHz (at the wavelength of $$\lambda = \frac{3 \cdot 10^8}{f} = \frac{3 \cdot 10^8}{1390 \cdot 10^6} = 0.21 \text{ m}).$$

One of possible parameter sets corresponding to the assigned impedance is calculated with (F10) by adjusting parameters:

2a=1 mm; d=42 mm; h=1.5 mm; ∈=3.2

The value of tape impedance is equal to $$\frac{Z_S}{W_0} = \frac{Z_S^t}{W_0} = 0.69i.$$

The proposed test installation can be additionally used along with an anechoic chamber.

FIG. 10 presents an embodiment of the test installation with an anechoic chamber.

The installation with the anechoic chamber is used as follows.

A receiving antenna (1006) is placed in an anechoic chamber with absorbing walls and ceiling (1001), and reflecting floor (1002).

Above the receiving antenna there is a top screen (1003).

The floor of the anechoic chamber (1002) optionally with an additional reflecting coating is served as a bottom reflecting screen, Outside the chamber in the line-of-sight of GNSS satellites there is a receiving antenna (1004) connected to a radiating antenna (1005) via a cable (1012).

Satellite signals are received from directions (1007, 1008, 1109), are transmitted to the radiating antenna (1005) via cable (1012) and being received by receiving antenna (1006).

Radiating antenna (1005) during reception-transmission process is moved along trajectory (1011) around screen (1003).

In this test installation all satellite signals will come to receiving antenna (1106) from direction to radiating antenna (1010), the signals having the same amplitude-phase distortions caused by screen (1003) effects.

This embodiment enables to have the same amplitude-phase distortions for signals from all satellites, these distortions being dependent upon previously known angular characteristics of amplitude and phase DD for an obstruction and a position of radiating antenna (1005).

Therefore, expressions (F1-F8) on the basis of assigned parameters of amplitude and phase distortions and angular oscillations periods for DD allow calculation of parameters for the test installation (dimensions of screen and parameters of its material) needed for simulating natural obstructions and debugging positioning algorithms, as well as facilitate buildup of such a test installation and tests and measurements.

This attains the aim of the present invention directed to building test installations simulating natural obstructions which cause multipath reflections and distortions of satellites signals.

As an alternative embodiment, the top screen may be shaped seen in FIG. 11, where the top semitransparent screen is shaped as a semi-cylindrical tunnel, the the antenna is mounted on a movable platform and is oriented such that angle α between a ray from the antenna towards a point of the top screen and a horizon is no more than 30 degrees.

Having thus described a preferred embodiment, it should be apparent to those skilled in the art that certain advantages of the described method and apparatus have been achieved. In particular, those skilled in the art would appreciate that the proposed system and method provide for convenient uploading of the digital pictures and accompanying data.

It should also be appreciated that various modifications, adaptations and alternative embodiments thereof may be made within the scope and spirit of the present invention. The invention is further defined by the following claims.

What is claimed is:

1. A method of manufacturing a test installation for simulating multipath reflections of GNSS signals, the method comprising:
   providing a top screen that is substantially dome-shaped and tent-sized, and made of a material that is semi-transparent in a radio frequency portion of an electromagnetic spectrum;
   providing a bottom screen that is reflective in the radio frequency portion of the electromagnetic spectrum;
   placing the top semitransparent screen over the bottom reflecting screen;
   placing a GNSS antenna connected to a receiver in the space between the top screen and the bottom screen; and
   measuring the GNSS signals received by the antenna, wherein the test installation is configured to simulate the multipath reflections.

2. The method of claim 1, wherein an angular period of oscillations ($T_\theta$) of a directional diagram (DD) is given and a radius (R) of the top screen is defined based on an angular period of oscillations ($T_\theta$) of the DD, as follows:

$$\frac{R}{\lambda} = (50 \pm 5)\frac{1}{T_\theta},$$

where λ is a wavelength;

$$T_\theta = (50 \pm 5)\frac{\lambda}{R}, deg,$$

a minimal period ($T_\theta$) is
wherein $$\frac{R}{\lambda} = 5 \dots 30,$$

and $T_\theta$ is in a range of 1.5 . . . 11 degrees.

3. The method of claim 1, wherein a phase diagram oscillations depth (ΔΦ) for a phase diagram (PD) is given and an impedance module for the top screen is $$\left|\frac{Z_S}{W_0}\right| = (55 \pm 5)\frac{1}{\Delta\Phi},$$

and is in a range of 0.45-1.2, where ΔΦ varies from 40 to 120 degrees; and
where $W_0$ is a characteristic impedance of the free space.

4. The method of claim 1, wherein a phase diagram oscillations depth (ΔΦ) for a phase diagram (PD) is given and an impedance module for the top screen is in a range of 0.1-0.45;
where ΔΦ=180*(2n+1) degrees, where n=1, 2, 3 . . . ; and
where $W_0$ is a characteristic impedance of the free space.

5. The method of claim 1, wherein amplitude diagram (AD) oscillation depth (ΔF) is given as |ΔF|=20 . . . 4 dB and impedance module of the top screen is $$\left|\frac{Z_S}{W_0}\right| = (2 \pm 0.2)10^{-0.05|\Delta F|}$$

and is
in a range of 0.2-1.2, and when |ΔF| is given such that |ΔF|>20 dB impedance
module of the top screen is in a range of 0.1-0.2, and
where $W_0$ is a free space characteristic impedance.

6. The method of claim 1, wherein the bottom screen is comprised of metal or a metalized foil or a metal mesh with a mesh period $d_g$<0.2λ and a wire diameter $2r_g$>0.01λ, and
wherein the bottom screen can project beyond a lower edge of the top screen by a distance L, where 0<L<5Ω.

7. The method of claim 1, wherein the top semitransparent screen is shaped as a semi-cylindrical tunnel; and
wherein the antenna is mounted on a movable platform and is oriented such that angle α between a ray from the antenna towards a top edge point of the top screen and a horizon is no more than 30 degrees.

8. The method of claim 1, wherein the top screen is a slot mesh with capacitive and/or resistive-capacitive impedance.

9. The method of claim 1, wherein the top screen is a tape mesh with inductive and/or resistive-inductive impedance.

10. A test installation for simulating multiple reflections of GNSS signals, the test installation comprising:
a top screen that is substantially dome-shaped shaped and tent-sized, and made of a material that is semitransparent in a radio frequency portion of an electromagnetic spectrum;
a bottom screen that is reflective in a radio frequency portion of the electromagnetic spectrum;
the top semitransparent screen over the bottom screen; and
a GNSS antenna connected to a receiver and located between the top screen and the bottom screen,
wherein the receiver measures the GNSS signals received by the antenna, and
wherein the test installation is configured to simulate the multipath reflections wherein the test installation is configured to simulate the multipath reflections.

11. The test installation of claim 10, wherein an angular period of oscillations ($T_\theta$) of a directional diagram (DD) is given and a radius (R) of the top screen is based on an angular period of oscillations ($T_\theta$) of the DD, as follows:

$$\frac{R}{\lambda} = (50 \pm 5)\frac{1}{T_\theta},$$

where λ is a wavelength;

$$T_\theta = (50 \pm 5)\frac{\lambda}{R}, deg,$$

a minimal period ($T_\theta$) is
wherein $$\frac{R}{\lambda} = 5 \ldots 30,$$

and
$T_\theta$ is in a range of 1.5-11 degrees.

12. The test installation of claim 10, wherein a phase diagram oscillations depth (ΔΦ) for a phase diagram (PD) is given and an impedance module for the top screen is in a range of 0.45-1.2 and is $$\left|\frac{Z_S}{W_0}\right| = (55 \pm 5)\frac{1}{\Delta\Phi},$$

where ΔΦ to varies from 40 to 120 degrees; and
where $W_0$ is a characteristic impedance of the free space.

13. The test installation of claim 10, wherein an impedance module for the top screen is $$\left|\frac{Z_S}{W_0}\right| = 0.1 - 0.45;$$

where ΔΦ=180*(2n+1) degrees, where n=1, 2, 3 . . . ; and
where $W_0$ is a characteristic impedance of the free space.

14. The test installation of claim 10, wherein an impedance module of the top screen is in a range of 0.2-1.2 and is $$\left|\frac{Z_S}{W_0}\right| = (2 \pm 0.2)10^{-0.05|\Delta F|},$$

where |ΔF|=20 . . . 4 dB, and
when |ΔF|>20 dB, an impedance module of the top screen is in a range of 0.1-0.2, and
wherein $W_0$ is a free space characteristic impedance.

15. The test installation of claim 10, wherein the bottom screen is comprised of metal or a metalized foil or a metal mesh with a mesh period $d_g$<0.2λ and a wire diameter $2r_g$>0.01λ, and
wherein the bottom screen can project beyond a lower edge of the top screen by a distance L, where 0<L<5λ.

16. The test installation of claim 10, wherein the top semitransparent screen is shaped as a semi-cylindrical tunnel; and
wherein the antenna is mounted on a movable platform and is oriented such that angle α between a ray from the antenna towards a top edge point of the top screen and a horizon is no more than 30 degrees.

17. The test installation of claim 10, wherein the top screen is a slot mesh with capacitive and/or resistive-capacitive impedance.

18. The test installation of claim 10, wherein the top screen is a tape mesh with inductive and/or resistive-inductive impedance.

\* \* \* \* \*